May 29, 1962 C. E. ANDERSON Re. 25,177

VALVE

Original Filed July 9, 1956 4 Sheets-Sheet 1

INVENTOR.
CLIFFORD E. ANDERSON
BY
Browning, Simms & Hyer
ATTORNEYS

VALVE

Original Filed July 9, 1956 4 Sheets-Sheet 2

INVENTOR.
CLIFFORD E. ANDERSON
BY
Browning, Simms & Hyer
ATTORNEYS

INVENTOR.
CLIFFORD E. ANDERSON
BY
Browning, Simms & Hyer
ATTORNEYS

VALVE

Original Filed July 9, 1956 4 Sheets-Sheet 4

INVENTOR.
CLIFFORD E. ANDERSON
BY
Browning, Simon & Hyer
ATTORNEYS

United States Patent Office

Re. 25,177
Reissued May 29, 1962

25,177
VALVE

Clifford E. Anderson, 3807 Durness, Houston, Tex.

Original No. 2,911,188, dated Nov. 3, 1959, Ser. No. 596,497, July 9, 1956. Application for reissue Oct. 31, 1961, Ser. No. 149,832
13 Claims. (Cl. 251—175)

Matter enclosed in heavy brackets [ ] appears in the original patent but forms no part of this reissue specification; matter printed in italics indicates the additions made by reissue

This invention relates to valves [in which the closure or valve member is] adapted to establish a flowable type seal about a flow passage through the valve body [when seated therein]. In one of its aspects, this invention relates to particular improvements in gate valves of this type. In another of its aspects, it relates to a novel valve member and stem construction for use in such valves.

It is customary, in valves of the type above-mentioned, to dispose a flowable material upon the valve member in such a manner that it is adapted, when seated within the valve body and across a passageway therethrough, to be [compressed] *deformed* and seal about the passageway for closing same. The effectiveness of the seal is ordinarily dependent upon very close tolerances between such material on the valve member and the sealing surfaces of the valve body, and, in the case of gates, upon a wedging effect due to forcing of a tapered gate into its seat.

An object of this invention is to provide a valve of this general type [in] which [the valve member] is effective to provide a tight seal with the valve body without the close tolerances heretofore required.

Another object is to provide a gate valve in which the gate is effective to provide a tight seal with the valve body independently of the customary wedging effect.

Yet another object is to provide a valve of the general type described in which the valve member and stem are so constructed as to permit the valve member to in effect be floatable in response to the action of upstream pressure into tight sealing engagement with the downstream side of the valve body.

A further object is to provide a valve of the character defined in the foregoing object in which the valve member is so constructed as to grip an annular strip of flowable material between a relatively stiff part thereof and the sealing surface on the downstream side of the valve body about the passageway therethrough.

Still another object is to provide a simplified valve member and stem construction for use in accomplishing each of the foregoing objects.

A still further object is to provide a [gate] valve of this type in which [floatable] *flowable* material [on the gate] is caused to be confined and then [compressed] *deformed* into engagement with *a* sealing [surfaces] *surface* about the passageway through the valve body.

A still more particular object is to provide a [gate] valve of the character defined in the foregoing object in which the confinement and [compression] *deformation* of the flowable material is caused to occur substantially uniformly and simultaneously about said sealing [surfaces] *surface* and upon the application of a minimum of force thereto.

Yet another object is to provide a gate valve having a gate adapted to establish a flowable type seal about the passageway through the valve body, in accordance with the foregoing objects, but in which an annular strip of the flowable seal material is caused to be gripped between a stiffener of the gate and the valve body about the passageway at both sides of the gate.

Still a further object is to provide a gate and stem of simplified construction which is especially well suited for accomplishing the above objects which relate to gate valves.

A still further object is to provide a [gate] *valve member* and stem construction in which a portion of the stem is cooperable with flowable seal material [of the gate] in such a manner as to confine and then [compress] *deform* such flowable material, for the purposes above-mentioned.

Other objects, advantages and features of this invention will be apparent to one skilled in the art upon a consideration of the written specification, the attached claims and the annexed drawings.

In the drawings, wherein like reference characters are used throughout to designate like parts:

Figure 5:
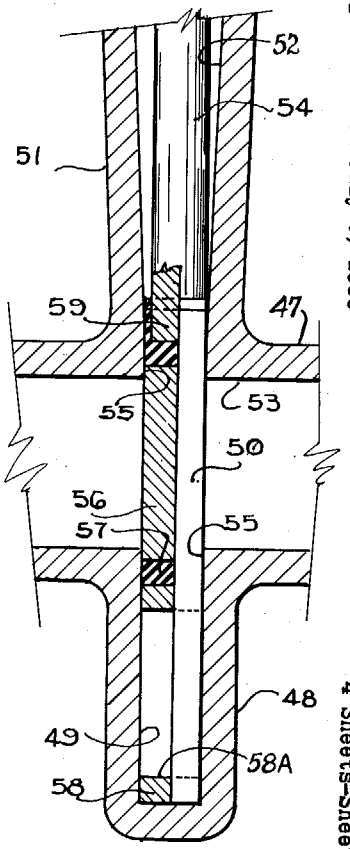
FIGS. 4 and 5 are cross-sectional and longitudinal-sectional views, respectively, of a conduit-type gate valve constructed in accordance with this invention, and with the gate in both views shown partly in elevation and partly in section.
Figure 6:
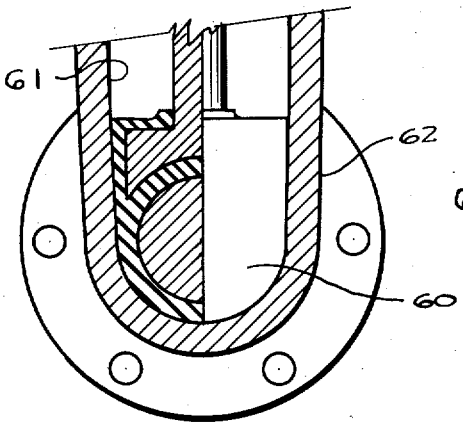
Figure 7:
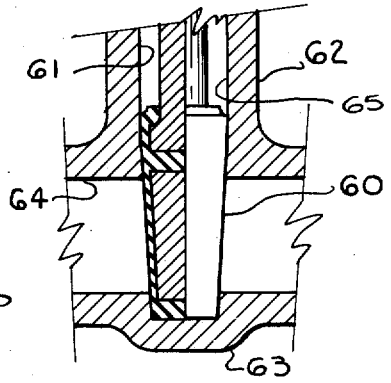
Figure 8:
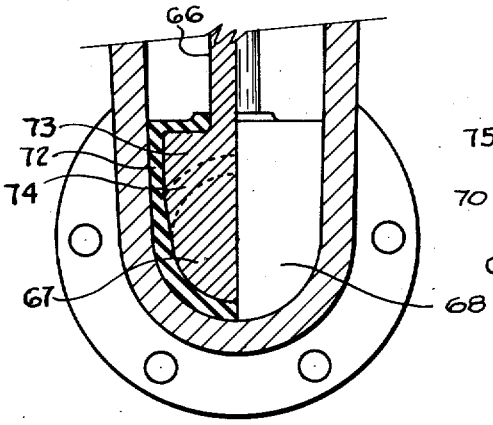
Figure 9:
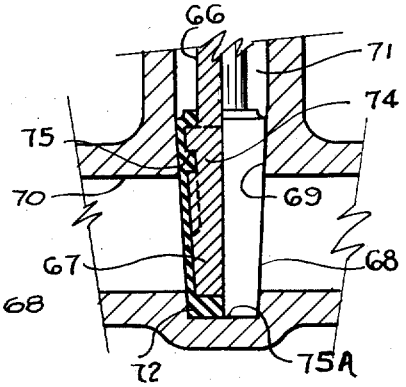
Figure 11:
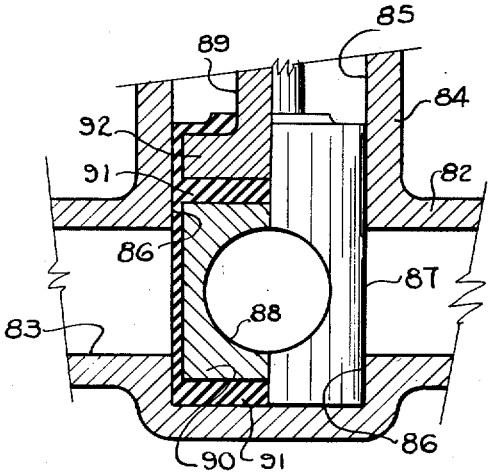
Figure 12:
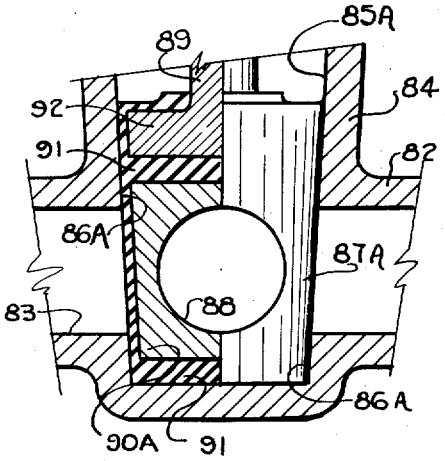
Figure 10:
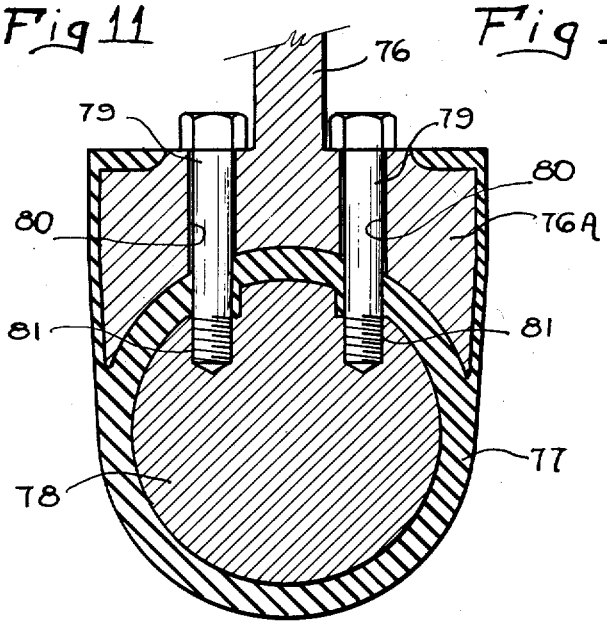

FIGS. 6 and 7 are views, similar to FIGS. 1 and 2 and FIGS. 4 and 5, of another embodiment of a gate valve constructed in accordance with the present invention;

FIGS. 8 and 9 are views, also similar to FIGS. 1 and 2 and FIGS. 4 and 5, of a still further embodiment of a gate valve constructed in accordance with the present invention, but differing from those previously mentioned in that a relatively rigid core of the gate is fixedly connected to the valve stem;

FIG. 10 is an enlarged detail view, partly in section, of a gate and stem for use in a gate valve constructed in accordance with the present invention;

FIG. 11 is a longitudinal-sectional view of a rotary plug-type valve constructed in accordance with the present invention; and FIG. 12 is a longitudinal-sectional view of a rotary plug-type valve similar to that shown in FIG. 11, but wherein the plug is conical.

In accordance with one novel aspect of the present invention, the valve member of the valve includes a relatively rigid core or stiffener which is surrounded by flowable material in both sides of the valve member for sealing engagement in the closed position with annular sealing surfaces on the valve body. These annular surfaces surround a passageway through the valve body at opposite sides of the intersection with said passageway of an opening in the valve body. A rigid valve stem extends through the aforesaid opening and is attached to the flowable material of the valve member in a manner to provide a flexible connection with the core for moving the valve member between passageway opening and closing positions. In this manner, the valve member will in effect be floatable due to pressure on one side thereof into tight sealing engagement with the annular sealing surface of the valve body on the other side thereof. Thus, contrary to prior practices, the tight seal between the valve member and the sealing surface about the passageway in ıe valve body is not dependent upon a very close tolerıce therebetween.

Furthermore, it is preferred that the relatively rigid ore be of such lateral dimensions as to extend entirely cross the body passageway in the closed position of the alve member and that opposite faces of the core be overed with said flowable material so that an annular trip of such flowable material is gripped between the ore and the body sealing surface to provide a still more ffective seal. As will be described more fully hereinfter, these novel features of the present invention may e incorporated into either a gate or a plug-type valve, nd, in accordance with a still further novel concept of ıe present invention, there is provided a valve member nd stem of simplified construction for use in accomlishing the above-described sealing function.

According to another novel concept of the present inention, which concept is peculiar to a gate type valve aving the above-described gate including a relatively igid stiffener surrounded by flowable material, means are rovided in cooperation with a [passageway] seat [opposite] *in* the opening in the valve body *intermediate the ealing surfaces* for confining the flow of such material hen the gate engages the seat. Thus, upon forcing of the ate into its seat, the flowable material thereof is caused o be [compressed] *deformed* into sealing engagement ith said annular sealing surfaces. Obviously, therefore, is unnecessary that very close tolerances be met between he flowable seal material of the gate and the sealing surıces of the valve body. In fact, it is contemplated that he gate may be moved into seated position without initial ngagement of the flowable material with the body sealing urfaces. [In accordance with a still further novel conept of this invention, the rigid stem extends through the pening and is anchored to the flowable material of the ate so as to provide a flexible connection between the tiffener thereof and such stem. In this manner, the flowble material is caused to be compressed into sealing enagement with the body sealing surfaces substantially uniormly and simultaneously thereabout, and with a miniıum of force applied thereto] *In accordance with a still urther novel concept of this invention, the rigid stem is ttached to the valve member in such a way that the stiffner or core which is surrounded by flowable material is loatable with respect thereto in a direction across the assageway. A means including a part on the stem is ooperable with the core and valve body to confine the low of such flowable material in the closed position of he valve member and then deform such confined mateial to cause it to seal tightly against the seating surface. Iore particularly, this causes the flowable material to eal substantially uniformly and simultaneously thereabout nd with a minimum of force, because the force so aplied through the deforming means is transmitted from me portion of the flowable material to the other through he floating core.*

According to yet another novel concept of the inven-ion, there is provided a gate and stem construction in hich a laterally extending part of the stem serves as the neans cooperable with the [passageway] seat to conine the flowable material of the gate in the manner abovelescribed. Still further, the part above-mentioned for onfining the flowable material of the gate may further erve as the anchor for attaching the stem to the flowable naterial of the stiffener so as to provide a flexible conıection between the stem and stiffener, as previously menioned.

Figure 2:
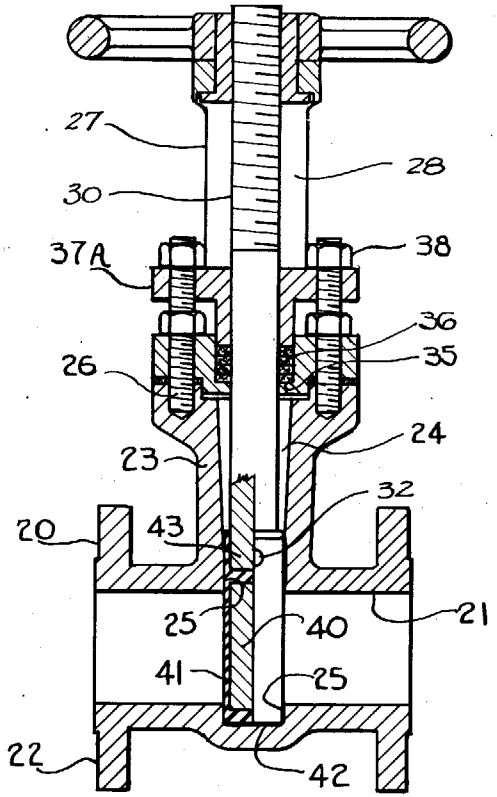
FIG. 2 is a longitudinal sectional view of the gate valve of FIG. 1, again with the gate thereof shown partly in elevation and partly in section.
Figure 1:
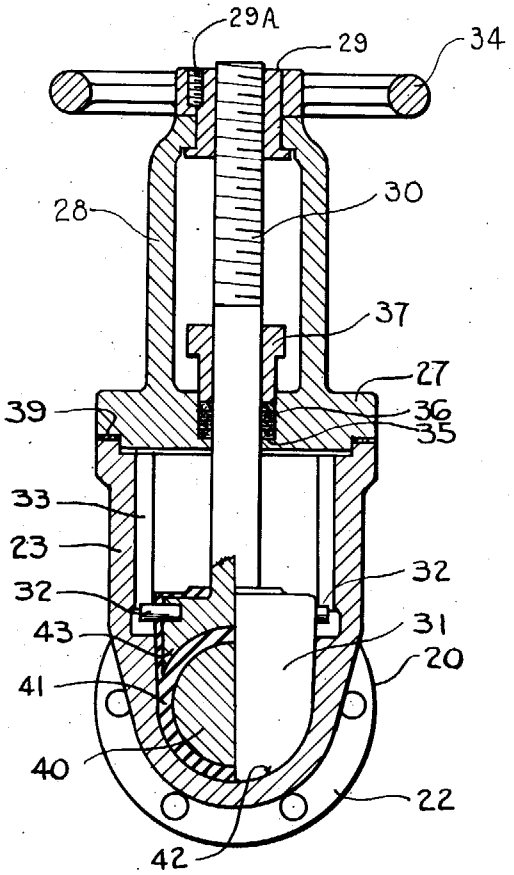
FIG. 1 is a cross-sectional view of a gate valve constructed in accordance with the present invention and with the gate in closed position, one side of the gate being shown in elevation and the other in section.

Referring now in detail to the several embodiments of he present invention, there is shown in FIGS. 1 and 2 a gate-type valve which includes a valve body 20 having a passageway 21 therethrough and flanged ends 22 for conıection in a flow line (not shown). The valve body is lso provided with a transversely extending portion 23 aving an opening 24 therethrough which intersects the passageway 21. Annular sealing surfaces 25 on the body surround the passageway 21 at opposite sides of the intersection of opening 24 therewith.

Bolted as at 26 to the upper flanged end of portion 23 of the valve body is a bonnet 27 of open spider construction 28 at its upper end. A nut 29 in the upper end of the spider 28 is threaded interiorly to receive an upper threaded end of a valve stem 30 and fixedly connected at 29a to a hand wheel 34. The lower end of the stem is in turn attached to a gate 31 having pins 32 on its opposite sides and received in guideways 33 in the portion 23 of the valve body, so that upon rotation of handwheel 34, the gate 31 is caused to move axially only within the opening 24. Obviously, mechanical expedients other than the rising stem construction above-described may be used for raising and lowering the gate.

A portion of the bonnet 27 through which the stem 30 is extended is provided with an annular recess having an upwardly facing shoulder 35 upon which packing 36 is received to provide a fluid tight seal about the valve stem during its axial movement. A gland 37 is received within the spider 28 of the bonnet and ears 37a thereon are connected to a portion of the bonnet by means of nuts 38 so that the packing may be [compressed] *deformed* between the shoulder 35 and the lower end of the gland. The interior of the valve is further sealed by means of conventional gasketing 39 between the bonnet and valve body.

Referring now more particularly to the novel aspects of the present invention, the gate 31 comprises a relatively rigid core or stiffener 40 which is surrounded by flowable material 41 on both sides of the gate for sealing engagement with the sealing surfaces 25 on the body in the closed position of the gate. The stem, which is conventionally of a rigid metallic material, is attached at its lower end and within the opening 24 to the flowable material 41 of the gate so as to provide a flexible connection with the core or stiffener 40 for moving the valve member between passageway opening and closing positions. It will thus be understood that with the gate seated as shown in FIGS. 1 and 2, upstream pressure (which may be from the left in FIG. 2) may act upon the upstream face of the gate so as to [compress] *deform* the flowable material thereof into tight sealing engagement with the annular sealing surface 25 on the downstream side of the valve body (to the right in FIG. 2). More particularly, since flowable material provides the only connection between the stem and stiffener 40, the gate in effect is permitted to float into tight sealing engagement with the downstream side of the valve body, thus obviating the necessity for close tolerances between the valve member and body.

As can be seen from FIGS. 1 and 2, there is formed in the [passageway opposite the] opening 24 and intermediate the sealing surfaces 25 a seat 42 for the lower end of the gate. More particularly, the flowable seal material is engageable with the seat 42 as the gate is lowered into passageway closing position. Obviously, as the stem is moved axially to further force the gate downwardly upon the seat 42, the flowable material is [compressed] *deformed* to establish with the seat a pressure-tight seal.

The lower end of the valve stem 30 is attached to the flowable material of the gate by means of a laterally extending portion 43 which is embedded within the flowable material, as best shown in FIG. 2, so as to serve as an anchor. More particularly, this portion 43 of the gate extends laterally substantially coextensively with the width of the flowable material of the gate, as shown in FIG. 1, so that it is cooperable with the seat 42 to confine such material as the gate reaches its seated position. Thus, as the gate is seated and further forced downwardly by rotation of the stem, the flowable material which surrounds the core is actually [compressed] *deformed* outwardly into tight sealing engagement with surfaces 25, again despite the fact that close tolerances between the valve member and the valve body may not be met.

Figure 2A:
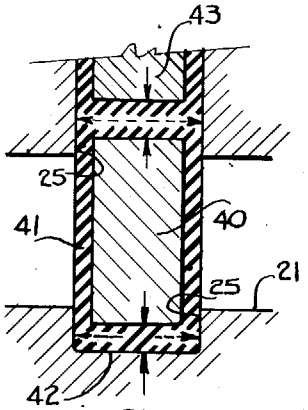
FIG. 2A is an enlarged view of the gate of the valve as it is shown in FIG. 2, but with the entire gate shown in section.

With reference particularly to the enlarged view of FIG. 2A, it will further be appreciated that inasmuch as the flowable material is continuous about stiffener 40 and confined not only between anchor 43 and seat 42 but also between the upper and lower ends of stiffener 40, as indicated by the solid arrows of such figure, its [compression] *deformation* into tight sealing engagement with surfaces 25, as indicated by the broken arrows, will be substantially uniform and simultaneous thereabout, so that the force required in establishing such a seal is kept to a minimum. That is, it is unnecessary in effecting this [compression] *deformation* to displace large quantities of the flowable material by transmitting the force applied by the downward movement of the stem from one portion of such material to another, as is the case in another embodiment of the invention to be described hereinafter.

As best shown in FIG. 2, the stiffener or core 40 is of a disc-shape substantially concentric with and of such lateral dimensions as to extend entirely across passageway 21 in the closed position of the valve member. Also, the opposite sides or faces of the stiffener 40 are covered with the flowable material 41 so that there is provided an annular strip of flowable material at each side of the gate which is gripped between the outer periphery of the stiffener and the sealing surfaces 25. Thus, the stiffener 40 not only serves to add sufficient rigidity to the gate to prevent its collapse into the passageway when subjected to high pressures, but also it is cooperable with the flowable material to enable a still more secure seal with surfaces 25, in the manner above described.

Referring to further details of the embodiment of the invention above-described in connection with FIGS. 1 and 2, the flowable material may obviously be rubber or a suitable plastic material, such as Teflon. Although the latter does not have the flowability of rubber, it may well prove satisfactory for the purposes of this embodiment of the invention since, as previously mentioned, only minor unit displacement of the flowable material is required in [compressing] *deforming* same into tight sealing engagement with the annular sealing surfaces of the valve body. The relatively rigid core or stiffener 40 should, of course, be of a material having greater stiffness than the flowable material 41 and have some load carrying capacity.

Although it is preferred, as previously described, that the stiffener be of such lateral dimensions as to extend outwardly beyond the passageway 21 when seated, it may actually be smaller than such passageway, in which case it would rely upon the resistance of the flowable material to shear in maintaining the valve member in closed position. Also, it will be understood that again there would be a smaller annular strip of such flowable material gripped between the stiffener and valve body but, in this latter described instance, such strip would be within the inside diameter of passageway 21.

Although means other than the laterally extending anchor portion 43 of the valve stem may be used for confining and then [compressing] *deforming* the flowable material of the valve member, the stem and gate construction illustrated and described is preferred due to its greatly simplified nature. As shown in FIGS. 1 and 2, the pins 32 on the gate receivable within guideways 33 may be fixed to the anchor 43. Furthermore, both the anchor and the stiffener 40 may be molded within the flowable material 41. During such a molding process, it may be found that portions of the flowable material on the valve member sealable with the sealing surfaces 25 of the valve body may actually shrink so that when disposed within the valve body, they will be out of contact with such surfaces as the valve member moves into seated position, and prior to the [compression] *deformation* of the flowable material in the manner previously described. Obviously, this would not prevent the proper functioning of the seal of the present invention, but, in fact, may prolong the life of the gate by permitting greater ease in seating and unseating. Inasmuch as the gate is guided for vertical movement by means of the pins 32 and guideways 33, the opening 24 may be tapered outwardly from the intersection thereof with passageway 21 so as to further permit ease of movement of the non-tapered gate therein.

Figure 3:
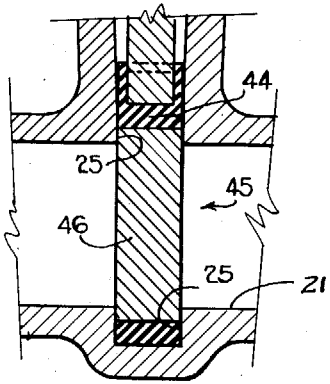
FIG. 3 is a partial longitudinal sectional view of a gate valve similar to that shown in FIGS. 1 and 2, but having a slightly modified gate.

The gate 45 illustrated in FIG. 3 differs from that illustrated in FIGS. 1 and 2 inasmuch as the flowable material 44 thereof does not cover any part of the opposite sides or faces of the relatively rigid core or stiffener 46. Thus, in place of the annular strip of flowable material which is gripped between the stiffener and the annular sealing surfaces 25 of the valve body in the embodiment of FIGS. 1 and 2, annular portions of each side of the relatively rigid stiffener 46 of gate 45 are directly engageable with the sealing surfaces 25 in the closed position of the gate. This latter modification has the desirable feature of less friction between the gate and body during seating and unseating of the gate.

Figure 4:
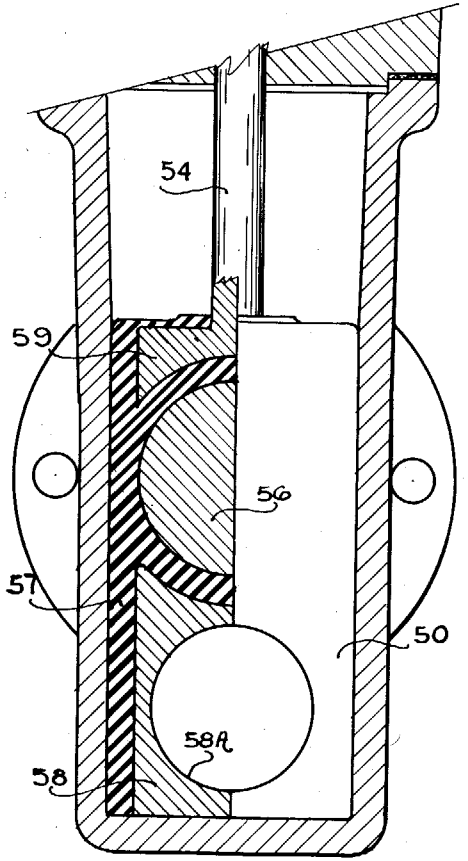

The embodiment of the invention illustrated in FIGS. 4 and 5 comprises a conduit-type gate valve in which a valve body 47 is provided with a first laterally extending portion 48 having a well 49 therein for receiving and seating the lower end of the conduit-type gate 50 of the valve in passageway closing position. More particularly, and as described in connection with the embodiment of FIGS. 1 and 2, the valve body is provided with another laterally extending portion 51 opposite portion 48 and having a tapered opening 52 therethrough intersecting valve body passageway 53. The conduit-type gate 50 and its stem 54 are adapted to extend and be moved through this opening in a manner, for example, as described in connection with the embodiment of FIGS. 1 and 2. Also, sealing surfaces 55 are provided on the valve body in surrounding relation to the passageway 53 therethrough at opposite sides of the intersection of opening 52 with the passageway. It will be understood that the non-tapered gate 50 is guided during its vertical movement by means of the annular surfaces 55 as well as the well 49.

This gate includes a relatively rigid stiffener 56 which is surrounded by flowable material 57 on both sides of the gate for sealing engagement with the annular body sealing surfaces 55 when the stiffener is disposed across the passageway for closing same. Thus, the stiffener and the surrounding flowable material provide an imperforate portion of the gate 50. Another portion 58 of the gate flexibly connected to the imperforate core by means of the flowable material 57 is provided with a conduit 58a therethrough registerable with the valve body passageway 53 in the open position of the gate. Obviously, the stem 54 of the gate 50 may be provided with apparatus similar to that shown in FIGS. 1 and 2 for moving the conduit-type gate 50 between the aforementioned opened and closed positions.

As shown in FIG. 5, the flowable material 57 surrounding the core 56 on both sides of the gate will be confined and then [compressed] *deformed* into sealing engagement with annular surfaces 55 of the valve body as the lower end of the gate is forced into engagement with the bottom of the well 49. Thus, the portion 58 of the gate through which conduit 58a is disposed provides a rigid force-transmitting connection between the bottom of the well and the flowable material 57 surrounding the underside of the stiffener 56 so that it serves as a seat in cooperating with an anchor 59 on the lower end of stem 54 and embedded within the flowable material for confining and then [compressing] *deforming* same. In these respects, of course, this type of valve is similar to those previously described. It will further be noted that this embodiment of the conduit-type gate is similar to the gate described in connection with FIG. 3 inasmuch as annular surfaces on stiffener 56 provide low friction-type sealing engagement with the sealing surfaces 55 of the valve body.

The embodiment of the invention shown in FIGS. 6 and 7 will be found to be identical to that described in connection with FIGS. 1 and 2, except that both gate 60 and the lower end of opening 61 in portion 62 of the valve body 63 intersecting passageway 64 therethrough are of a tapered construction. Also, the upper end of the opening 61 is non-tapered so as to provide a guide for the gate 60 as it moves within such opening between seated and unseated positions. That is, as can be seen from FIG. 7, the sides 65 of the upper end of the gate are parallel for sliding engagement with the upper end of gate 60. In this manner, there is no need for the separate pins and guideways of the embodiment of FIGS. 1 and 2. Since this embodiment of the invention is similar in other respects to those previously described, further description thereof is thought unnecessary.

The gate valve illustrated in FIGS. 8 and 9 differs from those previously described inasmuch as the lower end of a rigid stem 66 thereof is fixedly connected to a relatively rigid core or stiffener 67 of the gate 68. Thus, as distinguished from the earlier described embodiments, the flowable material 72 of the gate 67 thereof is normally fixed against floating into sealing engagement with annular sealing surfaces 69 on the body about the intersection of passageway 70 through the valve body with opening 71 for the valve stem 66.

The lower end of stem 66 is provided with a portion 73 which extends substantially coextensively of flowable material 72 (FIG. 8) and is fixedly connected to the stiffener by means of a narrowed web 74 which provides a shoulder 75 on the lower side of portion 73 for confining the flowable material 72 upon seating of the gate on seat 75a. Upon forcing of the gate into its [passageway] seat 75a, the flowable material 72 is [compressed] *deformed* first between such seat and the underside of stiffener 67 so as to initially seal with the lower portion of annular body surfaces 69. Inasmuch as the stem is rigidly connected to the stiffener, however, still further forcing of the gate is required to displace a sufficient quantity of the flowable material from about the underside of the stiffener to the upperside thereof beneath shoulder 75 for sealing with the upper portion of annular surfaces 69. That is, there is no movement of the upperside of stiffener 67 toward shoulder 75 so as to [compress] *deform* the upper portion of the flowable material uniformly and simultaneously with [compression] *deformation* of the lower portion thereof.

FIG. 10 illustrates upon an enlarged scale a gate and stem construction which may be found especially useful in connection with the embodiments of the gate valve previously described. Similarly to those previously described in this construction, the lower end of a stem 76 is provided with a laterally extending portion 76a for confining the flowable seal material 77 of the gate which surrounds relatively rigid stiffener 78. Also, as in the case of the other embodiments, the portion 76a as well as the stiffener 78 may be molded within the flowable material 77. However, as shown in FIG. 10, this particular construction includes a pair of bolts 79 extending loosely through openings 80 in the laterally extending portion 76a for connection at their lower ends with taped openings 81 in the stiffener 78. These bolts prevent the portion 76a of the stem from pulling away from the bonded flowable material 77, while at the same time maintaining a substantially flexible connection between the stem and stiffener. This construction may be found especially useful in large gates wherein the stiffener is considerably heavy so that upon unseating of the gate, there may be a tendency for the laterally extending portion 76 and stiffener 78 to be pulled apart and the bond with the flowable material 77 broken.

As is common in the art, the rotary plug-type valve of FIG. 11 is provided with a valve body 82 having a passageway 83 therethrough and a laterally extending portion 84 having an opening 85 therein intersecting the passageway 83. Also, annular sealing surfaces 86 are disposed about the passageway at opposite sides of the intersection of opening 85 therewith.

The cylindrical plug-type valve member 87 is provided with an opening 88 therethrough, and is rotatable between positions for moving the opening 88 into and out of registry with the passageway 83 in the valve body. For this purpose, the stem 89 which is attached to the plug 87 and extends within opening 85 is provided with suitable mechanism (not shown) for so rotating the plug, in a manner well known in the art, and as mentioned hereinafter.

In accordance with the present invention, however, the opening 88 is formed through an imperforate width of the plug which is provided by a relatively stiff core or stiffener 90 covered by flowable material 91 for sealing engagement with the annular surfaces 86 in the closed position of the valve. Furthermore, the stem 89 is anchored within the flowable material 91 by means of laterally extending portion 92 which, in the present embodiment of the invention, is of a disc shape extending substantially coextensively of the flowable material of the plug. Thus, as in certain of the other embodiments of the present invention, the valve member or plug 87 is flexibly connected to the stem so that it may in effect float into sealing engagement with the annular surfaces 86 of the valve body in the closed position thereof.

In accordance with another novel aspect of this invention, the core 90 of the plug 87 is of sufficient height so as to bridge and extend beyond the diameter of the passageway 83, whereby there is gripped between the core and sealing surfaces 86 annular strips of flowable material at each side of the valve member.

Furthermore, it is possible in a straight type plug valve of this type, to relieve downward pressure on the stem prior to rotation of the plug, and then to reapply such pressure for [compressing] *deforming* the flowable material thereof, as described above in connection with gate valves.

The embodiment shown in FIG. 12 differs from that shown in FIG. 11 in that the plug 87a, sealing surfaces 86a, stiffener 90a and opening 85a are conical. Although this type of valve may be merely rotated between opened and closed positions, it is often the practice to provide an operator for rotating the plug between open and closed positions which will lift, turn, and then lower same. In this manner, it may be possible with the embodiment shown in FIG. 12 to actually force the plug into its seated position whereby there will be confinement and then [compression] *deformation* of the flowable material 91 into tight sealing engagement with surfaces 86a, as in the case of certain of the previously described embodiments of this invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body having a passageway therethrough, an opening in the body intersecting the passageway, annular sealing surfaces on the body surrounding the passageway at opposite sides of the intersection of the opening therewith, a valve member movable within the body between passageway opening and closing positions, said valve member including a relatively rigid core surrounded by flowable material on both sides of the valve member for sealing engagement with said sealing surfaces on the body in the closed position of the valve member, and a rigid stem extending through the opening and attached to the valve member for moving said valve member between passageway opening and closing positions, said stem and core being flexibly interconnected by the flowable material therebetween.

2. A valve of the character defined in claim 1, wherein the lateral dimensions of said core are such as to extend entirely across said body passageway in the closed position of the valve member.

3. A valve of the character defined in claim 2, wherein the valve member is a plug, and the core of the valve member is provided with an opening therethrough registerable with the passageway in the open position of the valve member.

4. A gate valve, comprising a body having a passageway therethrough, an opening in the body intersecting the passageway, annular sealing surfaces on the body surrounding the passageway at opposite sides of the intersection of the opening therewith, a seat in the [passageway opposite the] *body* opening and intermediate said sealing surfaces, a gate movable within the opening between passageway opening and closing positions, said gate including a relatively rigid stiffener surrounded by flowable material seatable upon said [passageway] seat in the closed position of the gate, a rigid stem extending through the opening and attached to the gate for moving it between open and closed positions, and means cooperable with said [passageway] seat for confining and then [compressing the flow of] *deforming* said flowable material which surrounds said stiffener, upon closing of the gate, into tight sealing engagement with said annular sealing surfaces.

5. A valve of the character defined in claim 1, wherein said core is of a diameter which extends concentrically outwardly of the passageway in the passageway closing position of the valve member.

6. A valve of the character defined in claim 5, wherein the opposite faces of the core are engageable with the annular seating surfaces on the body concentrically inwardly of the flowable material in the passageway closing position of the valve member.

7. A valve of the character defined in claim 5, wherein the flowable material covers the opposite faces of the core to provide an annular strip of such flowable material between the core and annular body sealing surfaces in the passageway closing position of the valve member.

8. A gate valve, comprising a body having a passageway therethrough, an opening in the body intersecting the passageway, annular sealing surfaces on the body surrounding the passageway at opposite sides of the intersection of the opening therewith, a seat in the [passageway opposite the] *body* opening and intermediate said sealing surfaces, a gate movable within the opening between passageway opening and closing positions, said gate including a relatively rigid stiffener surrounded by flowable material seatable upon said [passageway] seat in the closed position of the gate, and a rigid stem extending through said opening and attached to said flowable material to provide a flexible connection for moving the gate between open and closed positions, said stem including a part extending substantially coextensively of said flowable material on a side thereof opposite that seatable upon the [passageway] seat for confining and then [compressing the flow thereof] *deforming said flowable material,* upon closing of the gate, into sealing engagement with said annular body sealing surfaces.

9. A valve, comprising a valve body having a passageway therethrough, an opening in the body intersecting the passageway, an annular sealing surface on the body surrounding the passageway at one side of the intersection of the opening therewith, a valve member movable within the body between passageway opening and closing positions, said valve member including a relatively rigid core surrounded by flowable material for sealing engagement on one side of the valve member with said sealing surface on the body in the closed position of the valve member, and a rigid stem extending through the body and attached to the valve member for moving said valve member between passageway opening and closing positions, said stem and core being flexibly interconnected by the flowable material therebetween.

10. A valve of the character defined in claim 9, wherein there is a well in the body [intersecting the passageway] opposite and in alignment with the opening, the valve member comprises a gate movable within the well and opening, and a conduit through a portion of the gate and registerable with the passageway in the open position thereof, said portion of the gate and the bore being flexibly connected by said flowable material.

11. A valve of the character defined in claim 9, wherein the valve member is a gate, and said stem has an anchor embedded within the flowable material to provide the flexible connection between the stem and core, and bolt means providing a relatively loose connection between the [hanger] *anchor* and core.

*12. A valve, comprising a valve body having a passageway therethrough and an annular sealing surface thereon surrounding the passageway, a valve member movable within the body between passageway opening and closing positions and including a relatively rigid core which extends at least substantially across the passageway in the closed position of the valve member, a body of flowable material surrounding the core for sealing engagement with the sealing surface on the valve body in the closed position of the valve member, a rigid stem mounted on the valve body and attached to the valve member for moving said valve member between passageway opening and closing positions, said core being floatable with respect to the stem in a direction across the passageway, and means including a part on the stem for cooperation with said core and valve body to confine the flow of said flowable material in the closed position of the valve member and then deform such confined material against said seating surface.*

*13. A valve of the character defined in claim 12, wherein said stem part is anchored to the body of flowable material so that the stem and core are flexibly interconnected by the flowable material therebetween to permit said core to float with respect to said stem in a direction axially of the passageway.*

References Cited in the file of this patent or the original patent

UNITED STATES PATENTS

| | | |
|---|---|---|
| 2,285,343 | Marchand et al. | June 2, 1942 |
| 2,331,557 | Lorehn | Oct. 12, 1943 |
| 2,372,869 | Wheatley | Apr. 3, 1945 |
| 2,510,442 | Volpin | June 6, 1950 |
| 2,734,714 | Knox | Feb. 14, 1956 |
| 2,746,710 | Jones | May 22, 1956 |
| 2,865,597 | Lucas | Dec. 23, 1958 |
| 2,925,245 | Lucas | Feb. 16, 1960 |

FOREIGN PATENTS

| | | |
|---|---|---|
| 106,352 | Australia | Jan. 9, 1939 |
| 160,913 | Australia | Jan. 22, 1953 |
| 488,482 | Canada | Dec. 2, 1952 |
| 713,051 | France | Aug. 10 1931 |